Jan. 28, 1930. W. E. HOLLAND 1,744,896
ELECTRIC BATTERY
Filed Nov. 5, 1921 2 Sheets-Sheet 2
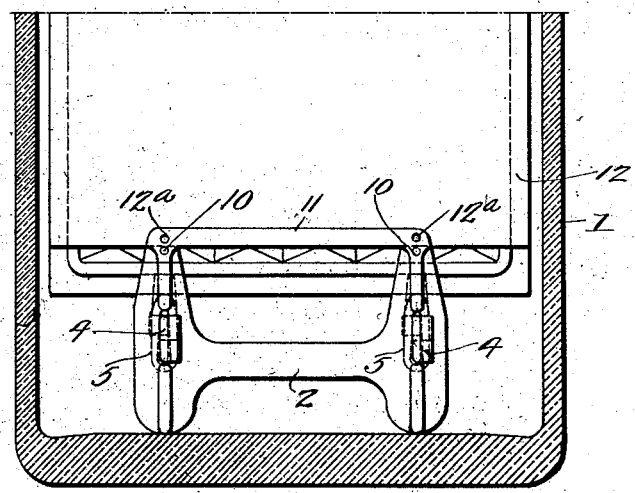
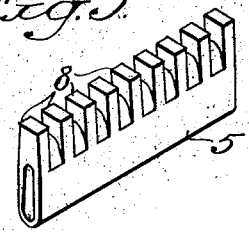
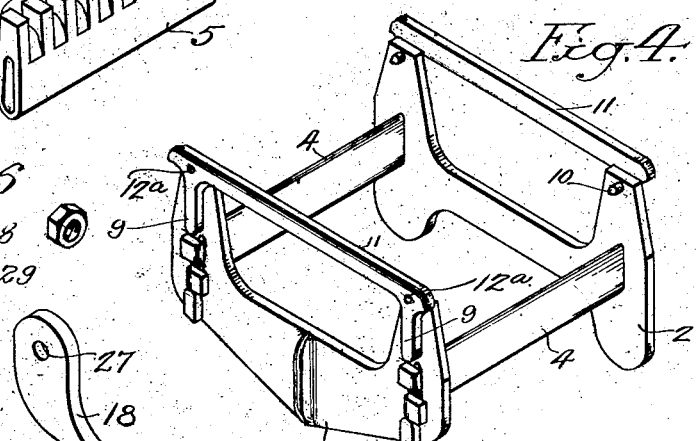
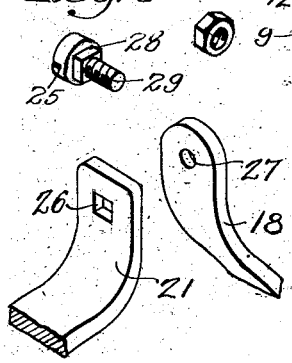
Inventor,
Walter E. Holland
by his Attorneys,
Howson & Howson Patented Jan. 28, 1930

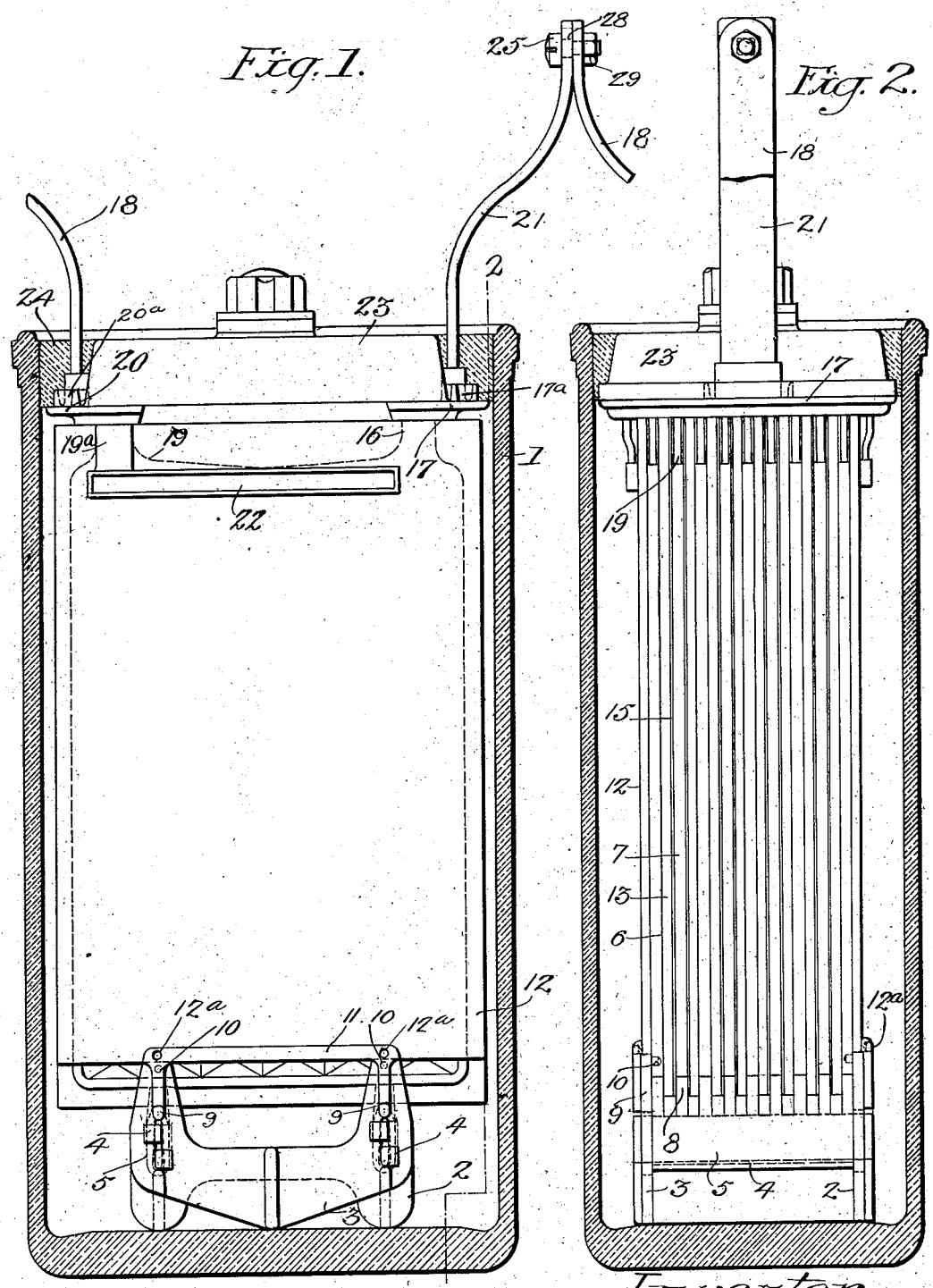

1,744,896

UNITED STATES PATENT OFFICE

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

ELECTRIC BATTERY

Application filed November 5, 1921. Serial No. 513,027.

This invention relates to batteries designed for use in connection with isolated electric plants or for other purposes, in which the cell jars of glass or similar material vary greatly as regards their form and inside dimensions, so that they cannot be depended upon to support and hold together the battery plates and separators.

One object of the present invention is to provide effective as well as relatively simple and substantial means independent of the jar walls, for properly holding together and supporting the plates and plate separators of a battery cell.

Another object of the invention is to provide novel means for supporting the plates and separators of a battery cell at some distance above the bottom of the jar in which they are mounted and at the same time clamping them together so that the several parts will necessarily retain their proper relative positions; the arrangement of parts being such that the separators will project some distance beyond the plate edges at the bottom as well as at the sides and top, thus preventing the formation of "bridges" or "moss" with resultant short-circuiting of the plates.

Another object of the invention is to provide a novel clamping structure attachable to the plate-and-separator element of a battery cell which, upon being lowered into a jar with the element, will provide stable support for the same even though the bottom of the container be wavy or uneven.

A further object of the invention is to provide a clamping and supporting structure for a battery element which can be attached to substantially straight-edged plates or those without special projecting lugs, thus obviating the necessity of making special plates having projecting portions at the bottom or sides.

Another object of the invention is to provide simple means for holding sheets of wood veneer or other material against the outer faces of the outside plates, to prevent expansion and loosening of the active material, which means shall be so designed as to add to the appearance of the cell and be capable of ornamental or distinctive design as well as available for carrying any desired lettering.

I also desire to provide a novel construction of connecting terminals for battery cells which shall visibly indicate their polarity and, as far as possible, insure the connection of the terminals of a number of cells all in the proper relation.

These objects and other advantageous ends I attain as hereinafter set forth, reference being had to the accompanying drawings, in which, Fig. 1 is a front elevation partly in vertical section, illustrating my invention as applied to a storage battery cell;

Fig. 2 is a vertical section on the line 2—2, Fig. 1;

Fig. 3 is a fragmentary vertical section similar to part of Fig. 1, illustrating a modification of my invention;

Fig. 4 is a perspective view of the supporting frame forming part of my invention;

Fig. 5 is a perspective view of one of the insulating sleeves used with the frame shown in Fig. 4; and Fig. 6 is a detached perspective view of the terminal connecting means of two adjacent cells.

In the above drawings, 1 represents the container of a storage battery cell, illustrated in the present instance as a glass jar having mounted within it a plate-supporting structure consisting of two end members 2 and 3 and cross bars 4. Said members may be either identical in form as shown in Fig. 3 or different as regards their supporting feet, as shown in Figs. 1 and 4. In the former case the member 2 has at its opposite ends a pair of separated supporting feet designed to rest upon the bottom of the container 1 and in the latter case the member 3 has a single supporting foot projecting downwardly from its middle portion.

Said members 2 and 3 are connected by two parallel cross bars 4, which, with them, are preferably made of lead alloy or other metal insoluble in the electrolyte of the battery cell in which they are mounted. The cross bars 4 are preferably in the form of strips having their ends extended through slots in the frame members 2 and 3 and turned over at right angles on the outside faces of said members so as to hold these in fixed relative positions. Said cross bars preferably have their greatest width at right angles to the plane of the bottom of the container and each of them has mounted on it between the members 2 and 3 an insulating covering in the form of a sleeve 5 whose top edge is serrated or toothed to receive and hold in properly spaced relation the alternate plates and plate separators of the cell. These include a series of negative plates 6 alternating with a series of positive plates 7, and the lower edges of all of these plates rest upon and are carried by the flat tops of the supporting projections 8 of the insulating sleeves 5, while the separators project into the grooves between the said projections 8.

The end members 2 and 3 of the frame are extended upwardly above the cross bars 4 as indicated at 9 so as to engage the outside faces of the lower parts of the two outermost negative plates 6, and each of them has an inwardly extending pin-like tooth 10 entering a hole just above the bottom of the grid frame of the negative plate which it engages so that the supporting structure is made fast to the plate element and can be inserted in or withdrawn from the jar with the same. The two extensions 9 of each of the members 2 and 3 are connected at their upper ends by an integral cross piece 11 which projects slightly above them and is offset so as to engage and hold in place the bottom edge of a wooden protecting sheet 12 which extends over the outside face of each of the outer negative plates 6 and rests upon the shoulders of said extensions 9. Each of the cross members may have molded or otherwise formed in it a recess 12ᵃ whose relatively thin bottom may be outwardly projected by a suitable pointed tool so as to bite into the adjacent outer wooden plate 12 and hold it from lateral movement.

Between each of the negative and positive plates 6 and 7 are mounted wooden or other insulating separator plates 13 whose lower edges extend into and rest upon the bottoms of the recesses between adjacent teeth 8 of the supporting sleeve 5 so that they project some distance below the bottom edges of said positive and negative plates. These separator plates also extend laterally beyond the side edges of the positive and negative plates as indicated in Fig. 1 and between each of them and the adjacent positive plate may be placed a slotted or otherwise perforated and relatively thin retainer plate 15 usually made of hard rubber.

From one side of the upper edge of each of the negative plates a connecting lug 16 projects upwardly and is burnt to a terminal strap 17 from which a terminal connector 21 projects upwardly. Similar lugs 19 on the positive plates are likewise connected to a common strap 20 from which projects a second terminal connector 18.

For retaining in place the tops of the outside wooden protective sheets 12, I provide extra lugs 19ᵃ projecting downwardly from the opposite ends of one of the connecting straps and laterally extended in the form of substantially horizontal bars 22 parallel to and in close engagement with the outer faces of the upper ends of the wooden sheets 12 respectively. The bars 22 are preferably made of a leaden alloy and may be of an ornamental or distinctive design with lettering if desired. A suitable cover 23 is mounted on the connecting straps 17 and 20 so that it, together with the horizontal portions of the connecting straps, closes the upper end of the container 1. A sealing compound 24 is poured in the space above the straps and around this cover adjacent the top edges of said container. If desired the straps 17 and 20 may have upstanding portions 17ᵃ and 20ᵃ surrounding or partially surrounding the bases of the terminal conductors to make a more effective seal at these points and prevent creepage of the electrolyte.

The terminal conductors 18 and 21 are preferably so made that their ends are visibly different in form and construction and they are provided with a connecting bolt 25 of such design as to render difficult if not impossible the connection of the positive terminal of one cell of a battery with any but the negative terminal of the next cell or vice versa. With this idea in view the negative terminal conductor 21 (Figs. 1 and 6) has a square hole 26 adjacent its end, which latter is made rectangular in outline. The positive terminal 18, on the other hand, has formed in its end a round hole 27 and its extremity is rounded or curved concentrically with this hole. The connecting bolt 25 has a body 28 of square section and of such dimensions as to closely fit the square opening 26 of the negative conductor 21, while its threaded end 29, which is made for the reception of a nut, is designed to fit the circular opening 27 of the positive conductor 18.

With the above construction, the polarity of the terminal conductors is visibly indicated by their form as well as by the shapes of the holes in them and it is obvious that the conductors of a series of cells can only be properly connected when they are arranged as indicated in the drawings, so that the square body 28 of each bolt may be placed in the square opening 26 of the negative terminal, with its threaded end portion extended through the circular opening 27 of the positive terminal 18. The diameter of said hole 27 is such that the square body of the bolt cannot enter it and the cylindrical part of the bolt is not long enough to receive the nut if it should be attempted to connect two positive straps. On the other hand, if a cell is turned around so that two square-hole or negative terminals come together, they can be bolted together, but this would cause two round-hole terminals to come together at the next cell, and as these could not be bolted together the mistake would be discovered.

From the above description it will be appreciated that the plate-and-separator element comprised by the assembled body of positive and negative plates with their separator and retainer plates, will be compactly held together and supported within the jar container 1 in such manner as to be independent of the side walls thereof as well as at a suitable distance above the bottom. The plates, separators, supporting structure and associated parts are assembled as a unitary element which can be readily lowered into place in the jar or removed therefrom without disturbing any of the parts other than the sealing compound. Moreover, even though the surface of the bottom be irregular, the supporting structure 2—3—4, particularly if made as indicated in Figs. 1 and 2 with two legs on one side and one on the other, will rest upon said bottom without tendency to wobble.

The plates and plate insulators are not only independently retained in proper spaced relation by the toothed insulating sleeves 5, but are clamped together in a compact mass whose elements are held in intimate engagement by the frame extensions 9 at the bottom and by the connecting straps 17 and 20 and retaining bars 22 at the top. The outer protecting sheets 12 with their support bars 22 and 11 effectively prevent excessive expansion and loosening of the active material on the outer faces of the two outside plates and give a neat finished appearance to the cell.

It will further be noted that the objects above stated are secured without requiring plates of special construction, since my supporting-and-clamping device engages the lower edges of the plates themselves without requiring projecting prongs, eyes, or other specially-formed attaching means thereon. Since the plate separators and positive and negative plates are more or less tightly clamped together by means of my device, said separators are immovably held so that they project beyond the side edges of the plates as well as below the bottom edges thereof, thus effectively preventing the formation of "moss" or "bridges" between adjacent positive and negative plates.

I claim:

1. The combination of positive and negative plates; a metallic structure supporting the weight of said plates and clamping them together; and means carried by said structure for insulating it from at least one set of plates.

2. The combination of positive and negative plates; insulating separators projecting beyond the bottom edges of said plates; a metallic structure supporting the weight of said plates and separators and clamping them together; and means carried by the structure for insulating it from at least one set of plates and for receiving the projecting edges of the separators.

3. The combination in a battery of a supporting frame; including a toothed element; with positive and negative plates and plate insulators resting on the toothed elements and supported by the teeth at different levels.

4. The combination in a battery of sets of positive and negative plates; straps respectively connecting the positive and negative plates; members carried by at least one of said straps outside of the plates; and protective sheets clamped by said members against the outer faces of the outside plates.

5. The combination of a plate-and-separator element; and a metallic frame for supporting said element including clamping end members and at least one cross member; with an insulating sleeve on said cross member provided with teeth for supporting said plates of the element at one level and the separators thereof at a lower level.

6. The combination of a clamping structure having end members; a series of plates clamped by said structure; teeth projecting from said end members and penetrating the surfaces of the outer plates of the series for attaching said supporting structure to the plates; and insulating separators between the plates.

7. The combination of positive and negative plates and plate insulators; a metallic frame for supporting the weight of said plates and including end members in clamping engagement with the outer plates; with toothed insulating members carried by the frame and supporting the plates on their teeth, the plate insulators extending below said plates and between the teeth of the insulating members and also projecting beyond the side edges of the positive and negative plates.

8. The combination of positive and negative plates; with a structure including two main frames adapted to support the weight of said plates one of said frames having one supporting foot and the other of said frames having two supporting feet in place thereof to afford thereby a three-point base.

9. The combination, in a battery, of sets of positive and negative plates, straps respectively connecting the positive and negative plates, members carried by at least one of said straps outside of the plates, protective sheets clamped by said members against the outer faces of the outside plates, and means secured to the bottoms of said outside plates for clamping the bottoms of said positive and negative plates together.

10. The combination, in a battery, of sets of positive and negative plates, straps respectively connecting the positive and negative plates, members carried by at least one of said straps outside the plates, protective sheets clamped by said members against the outer faces of the outside plates, a support structure secured to the bottoms of said outside plates, and means on said support structure for preventing displacement of said protective sheets.

WALTER E. HOLLAND.